United States Patent [19]

Felsenstein et al.

[11] Patent Number: 5,781,913
[45] Date of Patent: Jul. 14, 1998

[54] WEARABLE HYPERMEDIUM SYSTEM

[76] Inventors: Lee Felsenstein, 2490 Greer Rd., Palo Alto, Calif. 94303; Liz Rich, 151 E. 83rd St., New York, N.Y. 10028; William Mason, 419 Wheeler St., Seattle, Wash. 98109

[21] Appl. No.: 664,918

[22] Filed: Jun. 18, 1996

Related U.S. Application Data

[63] Continuation-in-part of Ser. No. 413,366, Mar. 30, 1995, abandoned, which is a continuation of Ser. No. 732,047, Jul. 18, 1991, Pat. No. 5,450,596.

[51] Int. Cl.⁶ .............................. G06F 3/47; G11B 33/12
[52] U.S. Cl. ..................... 707/501; 395/200.8; 345/169; 707/104
[58] Field of Search .............................. 395/800, 615, 395/612, 622, 131, 773, 11, 183.08, 12, 50.806, 998, 334, 328, 807, 762, 200.61, 200.8; 340/995, 980; 379/88, 94, 76; 345/8, 419, 169, 358; 348/115; 359/213; 364/DIG. 1, DIG. 2, 449.2; 381/25, 74, 183; 369/32; 707/512, 501, 2; 705/3

[56] References Cited

U.S. PATENT DOCUMENTS

| | | | |
|---|---|---|---|
| 4,257,306 | 3/1981 | Laflamme | 345/169 |
| 4,639,225 | 1/1987 | Washizuka | 434/308 |
| 4,760,330 | 7/1988 | Lias, Jr. | 395/183.08 |
| 4,807,157 | 2/1989 | Fukushima et al. | 395/131 |
| 4,914,586 | 4/1990 | Swinehart et al. | 395/612 |
| 4,931,950 | 6/1990 | Isle et al. | 395/11 |
| 4,982,341 | 1/1991 | Jordan | 395/680 |
| 4,994,987 | 2/1991 | Baldwin | 434/305 |
| 5,003,300 | 3/1991 | Wells | 345/8 |
| 5,101,364 | 3/1992 | Davenport et al. | 359/212 |
| 5,251,294 | 10/1993 | Abelow | 707/512 |
| 5,297,249 | 3/1994 | Bernstein et al. | 345/356 |
| 5,379,366 | 1/1995 | Noyes | 395/54 |
| 5,408,655 | 4/1995 | Oren et al. | 707/501 |
| 5,446,891 | 8/1995 | Kaplan et al. | 707/2 |
| 5,450,596 | 9/1995 | Felsenstein | 395/800 |
| 5,452,468 | 9/1995 | Peterson | 345/419 |
| 5,497,489 | 3/1996 | Menne | 707/1 |
| 5,517,407 | 5/1996 | Weiner | 704/1 |

*Primary Examiner*—Daniel H. Pan
*Attorney, Agent, or Firm*—Mitchell A. Stein; Stein & Associates, P.C.

[57] ABSTRACT

A wearable hypermedium information retrieval system for displaying predetermined digitized data, having a computer having an I/O port; a large capacity information storage and retrieval device interfaced with the I/O port adapted to receive a memory medium containing the predetermined digitized data, the storage and retrieval device being adapted to access the data on the memory medium and to provide the data to the I/O port means, the predetermined digitized data being further organized in a hypermedium format for hypermedium access and retrieval; a virtually hands-free command control device presenting no interference to ordinary use of the hands of the user to provide input commands from the user to the computer via the I/O port means; and a headset adapted to be worn by the user and a head mounted image display supported by the headset having a virtual image display having an eye-piece adapted to be positioned in front of one eye of the user and to display video display information from the computer. The system can be part of a network, can have at least one PCMCIA card slot, interfaces with other devices (like bar code readers, measuring tools, and IEEE cables), provides global positioning information, and includes retinal input control. Importantly, the hypermedium format involves hypertext, hyperpix, and combinations of the two to provide information in a logical, intuitive, computer-accessible format for access by users who understand information more graphically than verbally.

3 Claims, 4 Drawing Sheets

WEARABLE HYPERMEDIUM SYSTEM

CONTINUING HISTORY

This application is a continuation-in-part of U.S. application Ser. No. 08/413,366, filed on Mar. 30, 1995, now abandoned, which was a continuation of U.S. application Ser. No. 07/732,047, filed on Jul. 18, 1991, which matured into U.S. Pat. No. 5,450,596 on Sep. 12, 1995.

FIELD OF THE INVENTION

The present invention relates to the field of wearable computer-based systems, and more specifically, to a wearable hypermedium system, using hypertexted, animated, voice-synthesized, voice-activated information retrieval, for accessing, manipulating and displaying digitized information stored on a mass storage or other device, or otherwise rendered network-available. More particularly, the present invention relates to such a hypermedium system for "hands-free" operation where the user is able to access, manipulate, display, input and retrieve, with minimal inconvenience, information in hypertexted, animated, voice-synthesized, voice-activated wearable form. "Hands-free," as used herein, refers to a unit that permits a user to operate virtually without the requirement that his hands to support the unit or to enter commands via a keyboard or other device.

BACKGROUND OF THE INVENTION

1. General Background

In the field of maintenance and repair of complex machines and facilities such as airplanes, ships and nuclear power plants, maintenance and repair persons access numerous, sometimes thousands, of manuals and hundreds of instructions that are typically available in printed medium bound and available in various locations. For example, the maintenance manuals of a Boeing 747 would fill the entire space of itself and, one small nuclear power plant involves 4,000 manuals and 8,000 procedures. Moreover, paper-based manuals are seldom located where they are needed the most, and the procedures embodied in these manuals themselves produce unmanageable paperwork. Paper documentation is heavy, bulky, and costly to maintain. Even if the maintenance manuals are stored in an electronic media, they are still not, in most instances, conveniently available where they are needed most—with the maintenance and repair persons in the field repairing the equipment. Moreover, electronic storage has proceeded along the same lines as manual storage, although the electronic medium has the capacity of showing at most a few pages at a time.

In the sales and service industries, persons dealing with customers often have to meet the conflicting requirements of mobility and ready access to detailed information concerning inventory. There has long been a need for a convenient data retrieval system, displaying images and being capable of speaking to the user in an ordinary language. There is also a need for a mechanism by which a sales or service person, may at the same time, record orders or other related information to be input into the database maintained at company headquarters.

The world's information has been doubling in every three years and it seems that the speed of information accumulation continues to accelerate. With the advent of CD-ROM technology, much of this information is available to any user of a personal computer with a CD-ROM drive. A single CD-ROM disc costs less than $2 to produce but holds information equivalent to that of 500,000 pages of printed materials, such as an airplane maintenance manual, which could cost $2000 to produce. By way of example, one CD-ROM disc contains the equivalent of an 80-foot-high stack of text reports on paper using up the equivalent of eight adult trees. To date, CD-ROM is the only logical choice for large-scale information storage, distribution, and publishing and, digital information provides substantial benefits in search, retrieval and manipulation over printed or microfiche data. As technologies develop, however, other mass storage devices will likely emerge (e.g., zip drives and the introduction of DVD-ROM), or, in the alternative, wireless communications (e.g., portable satellite connections) all of which falling within the scope of this invention.

While notebook computers and other portable devices allow trained users to access databases in the field, such machines are not adapted for speech decoding and require a high level of training by the user. They require the use of both hands by the user and typically a desk top or other surface to hold the apparatus, and are often difficult or impossible to see in bright lights or natural daylight. These inconveniences arise as a consequence of a collision between typical information retrieval (via text) and computer-available information (via a screen).

As expected, the design of most electronic documentation today falls into the same trap as that of the first-generation cars. Most "electronic manuals" are designed in a "linear form"—very much like the printed manual, which is in many instances so inappropriate for electronic information as the "horseless carriage" design was for the modern automobile. In fact, a computer screen is a poor medium to convey text. Consequently there is a danger of misreading words on a screen, especially when attention is divided between the screen and focusing on the equipment being repaired.

For background purposes, the instant invention, directed to a hand-free, mass-storage based wearable computer and a system for creating hypermedium information to the wearer through the device, liberates maintenance and repair persons from cumbersome manuals and desk-bound delivery systems that have made impossible the availability of massive amounts of critical information in the field. The instant invention allows a user to comfortably wear on his body massive amounts of maintenance and repair information out into the field while his hands are free to carry tools and perform repairs. A heads-up display can easily be flipped to the side of the headset so that the user's eyes can be unimpeded for close inspection of work in progress. The display can be easily flipped back in front of one eye for checking on repair instruction.

One important aspect of this invention is its ability to display information in a hypermedium form, through the use of hypertexted, animated, voice-synthesized, voice-activated wearable information design. A 1990 U.S. Government study found that a multimedia delivery of information is 40% more effective than traditional text-based instruction. Studies of training sessions using multimedia aids showed a 30% increase of retention rate and a learning curve that showed a 30% increase in speed over the traditional training methods.

Another imperative for delivering information in hypermedium form is the mindset of the generations who have been fed much information via television. These generations are much more graphically oriented and will better understand ideas and instructions conveyed in a multimedia form as the U.S. Government study shows.

Furthermore, repair manuals are seldom written in plain language. Many people would avoid reading a maintenance manual if someone could instead be found to demonstrate the maintenance or repair. Through the use of hypertexted, animated, voice-synthesized, voice-activated wearable information design, manual information in this invention "shows" the user how to perform a repair in much the same way as an experienced mechanic. The display of information in hypermedia forms—dynamically linked text, animation, speech synthesis and graphics, allows the user to proceed at his own pace, choose the mode from which he learns best and to repeat instructions when necessary without bothering any other workers.

Another overwhelming burden to many industries is the volume of paperwork generated or demanded by government regulations. Much of the paperwork on inspections and repairs must be filed by maintenance workers following checklists, etc. Procrastination and neglect are more common than compliance with these government regulations. For example, the persistent problems of inadequate maintenance records has led the Federal Aviation Administration to levy millions of dollars of fines against various airlines and to even shut some of them down. The smart card capability of this invention eliminates the need for paperwork as the records are input into a computer via mouse commands or voice synthesis at the same time as the inspections or repairs are performed.

2. Hypermedium-Format including Hypertext and hyperpix

In the following brief description of hypertext and hypermedia, references are made to U.S. Pat. Nos. 4,982,344 and 5,446,891 for disclosure of a general understanding of object-oriented hypermedia systems. Reference is also made to B. Schneiderman, Hypertext: Hands On!, Addison-Wesley Publ. Co., (1989), for a general background discussion of the hypertext concept. For a more introductory treatment, reference is made to J. Conklin, "Hypertext: An Introduction and Survey", IEEE Computer, Vol. 20, pp. 17–41, (1987).

Hypermedia systems allow the user to navigate through large amounts of information and present a promising method for handling the dramatic increase in information available to the user. While paper documents lead the user down a sequential linear path, hypertext documents provide users with a choice of many different paths.

Hypertext describes a particular form of organization and presentation of information in a computer and is an element of a class of systems known as hypermedia. Hypermedia exploit the computer's ability to link together information from a wide variety of sources as a tool for exploring a particular topic. Such systems embrace large numbers of "data objects," which can be panels of text, titles, index entries or other data such as images, graphical tables, video or sound information, and so forth. The data object is said to reside at a "node" and may vary in size and type. A collection of such data objects is denominated herein as a hypermedium (or "hypermedium format"). For data objects limited to text panels, that is, blocks of text data of varying size, the collection is referred to as a hypertext document.

Each data object is essentially self-contained but may contain references to other such objects or nodes. Such references are normally used in a hypertext document and are referred to as "links." A link is a user-activated control reference that causes the data object at the link target node to be displayed. Normally, hypertext systems are window-based and the newly displayed object appears in a new window. The new object or panel may, of course, contain additional links to other such panels. By following these links from panel to panel, the user "navigates" through and about the hypertext document. This scheme provides user-control over the order of information presentation and permits the user to select what is of interest and how to pursue a given topic.

Thus, a hypertext document essentially consists of a set of individual data objects or nodes interconnected by links. Each link is a relation between two nodes. The link relation includes data relating the location of the first panel where the link starts and the location of the second panel that is the target. Such location information may be stored in various forms, for example, it may be in the form of byte offsets indicating the number of bytes from the start of a file.

The set of link data for a given view of a hypermedium is known in the art as a link matrix and is denominated a link "profile" herein. Each such link profile contains a unique link vector or list for every node in the hypermedium. Each link vector is a list of the links between the corresponding "originating" node and other "target" nodes. The aggregate of such vectors, one for each node, makes up one link profile for the hypermedium.

3. Description of Prior Art

The problems described hereinabove have not been specifically addressed in the prior art, but some devices have provided partial and relatively inadequate alternatives to the present invention.

U.S. Pat. No. 4,639,225 shows a portable TV having a TV housing with a screen large enough to display a real image and a 15 button keypad. The types of displays shown include electronic games, which typically have crude graphics with a relatively small amount of pixel and acoustic data. The device shown is essentially a television display apparatus and lacks any concept of accessing information in a manner that would leave the user free of burdensome screen displays or input devices. Additionally, this device does not provide a mechanism for the user to record data.

U.S. Pat. No. 4,257,306 shows a small dedicated light-weight device that could visually illustrate extremely limited information in response to queries input from a keypad. In this case, the query is restricted to the names of acoustical chords and the display, essentially a small number of on/off lights, shows only the guitar fingering needed to play the chord. This is thus a single-use apparatus with no adaptability for display of generalized information and no mechanism for recording information in the field.

U.S. Pat. No. 4,994,987 shows a system for randomly accessing stored images, including engineering drawings. However, this device is intended for the purpose of organizing a series of images for presentation to a large group of individuals. It does not accomplish the reduction of size or overcome the difficulty of displaying information in a virtual hands-free manner.

U.S. Pat. No. 5,497,489 shows a data storage and retrieved system and process for use with structural items of data relying on associative indexes to connect related items of data and not to connect unrelated items of data. The associative indexes are formed from mathematical and/or Boolean expressions for allowing know-how of an expert, stored in the system, to be extracted and put into context to a particular situation by a user inputting choices among alternatives and data into the system.

U.S. Pat. No. 5,446,891 shows a system for adjusting hypertext links with weighed user goals and activities—a smart hypermedia system that acquires user characteristics either directly or inferentially. Simple associative networks serve to model user profiles, including relationships between user goals and the hypermedia information nodes. User profiles can be combined to form group profiles and may be dynamically and continuously updated to form an adaptive system profile.

U.S. Pat. No. 5,408,655 shows a user interface system and method for traversing a database. Each set of compared document index terms characterizes an electronic document in a hypertext-type database which is selectively linked in that database with the user's present position. Each command option is represented by a portrayed character or personality associable to the user as being biased toward a particular type of information.

U.S. Pat. No. 5,297,249 shows a hypermedia linking service which enables client applications to incorporate hypermedia capabilities in an open system architecture. The users are provided with a consistent hypermedia interface completely managed by the hypermedia services and not by the client application itself.

U.S. Pat. No. 5,101,364 shows a method and facility for dynamic video composition and viewing which allows representation and arbitrary association of discrete image segments, both to create final compositions and to permit selective viewing of related segments. Information regarding image segments is retained in data structures that facilitate relational designations thereamong and sorting of image segments.

U.S. Pat. No. 5,517,407 shows a device for including enhancing information with printed information and method for electronic searching. In addition to printed material, an enhanced book includes enhancing material such as additional text, graphics and sounds, stored in a memory device attached to the book, together with a connector for allowing the enhanced book to be connected to an external computing device for accessing and presenting the enhanced information to the reader.

U.S. Pat. No. 5,452,468 shows a computer system with parallel processing for information organization. A computerized information retrieval system having consistency among a sensory network portrayed in a visual display, a semantic network that establishes the logic of data organization and retrieval and a mechanical storage network that locates data in a memory structure the networks having an architecture based on a life tree array that splits the search and storage paths into multiple paths for rapid access and retrieval in response to user queries.

U.S. Pat. No. 5,379,366 shows a method for representation of knowledge in a computer as a network database system. The system defines a novel database engine constituting a method for modeling knowledge as a network of concepts and a plurality of relationships between the concepts comprising the network. Each concept is represented as a record in the database which is identified by a unique record reference number. The unique record reference numbers are stored within the records comprising the database to record the plurality of relationships between concepts.

U.S. Pat. No. 5,251,294 shows an interactive information environment for accessing, controlling, and using information. Available sources of information are accessed, and components are extracted, labeled, and formed into discrete units called contexts. A user selects and rearranges context labels and their associated contents. Contexts are selected and combined into new information structures called alternates, which are combinable with contexts into preferred situations.

SUMMARY OF THE INVENTION

The present invention meets the requirement stated above by providing a light, portable hands-off or hands-free hypermedium system, using hypertexted, animated, voice-synthesized, and/or voice-activated wearable information design, for accessing, manipulating and displaying "electronic manual information".

Generally, the instant invention comprises a wearable hypermedium information retrieval and input system for displaying predetermined digitized data, with a computer having an I/O port; a large capacity information storage and retrieval device interfaced with the I/O port adapted to receive a memory medium containing the predetermined digitized data, the storage and retrieval device being adapted to access the data on the memory medium and to provide the data to the I/O port means, the predetermined digitized data being further organized in a hypermedium format for hypermedium access and retrieval; a virtually hands-free command control device presenting no interference to ordinary use of the hands of the user to provide input commands from the user to the computer via the I/O port means; and a headset adapted to be worn by the user and a head mounted image display supported by the headset having a virtual image display having an eye-piece adapted to be positioned in front of one eye of the user and to display video display information from the computer. Also added are an audio output having an earphone, and a real-time text to speech conversion module adapted to receive speech data from the computer and to provide audio input to a sound transducer in the earphone. Also, the storage and retrieval portion provides read/write capability for the data; and the virtual hands-free command controller has a voice recognition and decoding module for receiving decoding and providing for storage for voice-provided data. The system can be part of a network, can have at least one PCMCIA card slot, interfaces with other devices (like bar code readers, measuring tools, and IEEE cables), provides global positioning information, and includes retinal input control. Importantly, the hypermedium format involves hypertext, hyperpix, and combinations of the two to provide information in a nonlinear, associative, intuitive, computer-accessible format for users who comprehend information better via graphical-, audio-, image-, as well as text-based media.

The invention includes a light weight headset having an earphone, microphone and a video display attached in combination. The user looks through an eyepiece to view a virtual image that appears in front of the eyepiece, creating the illusion of a high-resolution computer screen floating in front of the user. The user sees an image that contains a cursor whose movement is controlled by one of a number of devices, including a command control device comprising an isometric or force operated "zero-motion mouse" which causes the cursor to respond to slight motions of the user's thumb, or voice-activation module or retinal-input control, and the like. Selection of data under the cursor is made by depressing the thumb, thereby leaving the hand relatively free. Other selections for voice-activation are voice commands or retinal locations.

The display system and command control are connected to a very lightweight computer that accesses data from a large capacity storage device, like a CD-ROM or DVD-ROM drive and stores user responses on, for example, a memory card. This allows the user at appropriate times to update the data by exchanging disks and to provide responses to the home office via input to the memory card. Furthermore, the cursor control and display software may be changed, from time to time, by re-programming a portion of the memory card. Other mechanisms for downloading information are also within the scope of the invention, including network access, remote access (via telephone lines or otherwise) or satellite-based communication systems.

Hypermedia have effectively eliminated the paper-bound concept of the page. Information expressed herein is dynamically linked together (hypertext) for user interactively to recall any portion of it (retrieval) or to navigate through it ("association").

Information displayed herein creatively and uniquely uses "hyperpix" in the same manner as hypertext: dynamic pictures linked to text or other pictures. Pictures can be line arts, graphics, 2D and 3D computer images or renditions, photographs, or animated buttons. The invention involves the use of hyperpix as instructional aides rather than to model the real world or create new ones as virtual reality does.

1. Definitions of Terms

Step: A step is a single, discreet action. By way of example, in removing a door knob from a door one must first unscrew the screws that hold it on before he can pull the knob from the door. Removing the screws is a discreet act, separate from pulling the knob off the door; the procedure would comprise these two steps. Each screen herein must show all the possible step numbers and indicate steps completed that can be returned to, the current step, and all remaining steps that can only be accessed in order.

Procedure: A procedure is a set of logical steps that when performed in order result in a particular outcome. By way of example, there is a set of steps for removing a carburetor from a engine block (removing procedure), another set for cleaning a carburetor (maintenance procedure), and another set for replacing a carburetor onto the engine (installation procedure). Writing a procedure is like writing a computer program. Each step describes how to perform exactly one action like a single line of program code.

A procedure is a complete piece of the jigsaw puzzle that is the manual. These pieces are fit together to make a process. A procedure can contain other procedures, in other words, if a step in a procedure needs further explanation, that is, exploded into more steps to accomplish that step then that is as procedure within a procedure. A procedure can contain a single step which may be used in many other procedures. A procedure is then reusable as a step in other procedures.

Procedures should be inseparable units. One can never jump into the middle of a procedure. Each screen contains one step of the procedure and an illustration or more likely, an animated set of steps. The user must always be shown on the screen how many steps are in any one procedure, if possible the time it normally takes to perform it, and the tools required.

Process: A process is a list of steps, some of which may be procedures, which constitutes the entire repair, maintenance act, etc. It is the topmost node in the chain of procedures. It is itself a procedures. A process looks like an exploded outline; it is not a tree.

2. "Electronic Manual Information" Available in Various Forms

Table of Contents A table of contents is an outline of topics contained in a document and indicates the page number where each subtopic can be found. It is, in reality, a type of index, an index of subjects organized, not alphabetically but in some other logical way. This organization may reflect organization of the actual object which is the main topic of the document. We have all come to expect a table of contents in the documentation we use. It is therefore necessary to include one in hyperdocuments, even though there are better ways of accessing information. An electronic table of contents differs from a printed one in its lack of page reference.

Schematic Entry A schematic is a diagram of an object or part of an object.

Table of Choices Inspection, Maintenance, Removal, Disassembly, Repair, Reassembly, Installation Diagnostics.

Index An index is a list of words or names of things that appear in the document and is arranged alphabetically. In a hyperlinked document such as wearable information, each designation in the index will be connected to all the other relevant subtext, and will appear beneath the designation when the word or graphic is double clicked, i.e., the word "brake" or a graphic (e.g., an airplane with hot stops showing where all the physical brake links are), when double clicked, will explode to show all the sections in the CD-ROM where the word "brake" or graphic appears so that the user can then link to the appropriate information. The user then double clicks on this hot spot or word and the screen switches directly to the section desired.

Physical Menu A cover is a physical necessity for a paper document as a way to protect the pages inside and displays the name of the publication it holds and perhaps an illustration or logo. A CD-ROM usually comes with encased in a protective, hard plastic jewel box which can contain a cover sheet resembling or duplicating the cover of a paper document. Publication information comprises the title, the author, the publisher's name and address, the copyright, indication of edition and printing. We know we can always find these items on the first pages of a paper book. In a repair and maintenance manual some of these items are very important; therefore they must be accessible fast, that is, to the naked eye. All of these items can be printed on the jewel box label, but since the jewel box and the CD-ROM can easily become separated, the title, the copyright, and the edition and pressing (since CD-ROM are pressed not printed) numbers, and the date of last update at least should be printed onto the disc label.

3. Specifications for Real-Time Text to Speech Synthesis, Audio, Voice Recognition & Hypertexted Wearable Information Design Developer links all steps, procedures and processes to voice recognition commands—such as next, repeat etc. Each word in the index has a combination of numerical and alphabetical designation so that the user can provide voice commands to hyperlink to the section desired or use a word like "expand" to be shown the next hyperlink layer.

Developer can override sound off (including Sound Blaster) when deemed necessary.

Developer has the ability to make a certain set of predefined text read to user when screen comes up. Text can be in a number of languages so that the text to speech can be accessed easily in the user's language.

User can make certain developer-defined text read by clicking on a button.

User has the ability to turn all sound (such as the Sound Blaster brand of audio technology) off or on universally through a button.

Text being read must be able to contain links.

Reading of text is interruptible, that is, will stop as soon as the user takes another action (like clicking on a link) or gives a voice command.

If a smaller window of text, animation or graphic is called up from a button layered on top of the screen, the text set to automatically be read on the screen will not be read again when the smaller window is put away.

4. Wearable Information Specification

A. Features done automatically for wearable information:

Ability to create, render, and archive 3-D graphic models.

Ability to render text characters in a variety of fonts, sizes, and styles.

Ability to create "hot spots" over any portion of the screen.

Ability to lock "hot spots" to parts of graphics so that "hot spots" move along with graphics if animated.

Uniquely identify screens numerically or alphanumerically for reference.

Divide job intelligently if spread over more than one disc.

Ability to lock "hot spots" to text.

Ability to use the same files on other platforms (portability); i.e., develop and use on many platforms simultaneously. Compilation probably occurs on one machine.

B. Features for the developer (command options):

Ability to resize graphics for zooms and pullbacks.

Ability to accept and use developer-defined commands (extendible).

Ability to name each screen and use that name for reference.

Ability to index all text except stopwords.

Ability to edit stopword list and save separately for each job.

Compilation of job for actual use (cut down on processing and prevent tampering).

Ability to chunk screens together and deny random access.

C. Features for the supervisor (options for usability):

Ability to time screens and produce a report.

D. Features for the user (options for usability):

Ability to backtrack through screens.

Interactivity: Interactivity is a fundamental part of the definition of multimedia. the user must have control over his viewing of information and he must set the pace of that viewing. The software should wait for his instructions animated sequences must be available for clarity of instructions at the click of a button or voice command initiated by the user.

Direct Manipulation: Users want to feel that they are in charge of the computer's activities.

User Control: The user, not the computer, initiates and controls all actions (Apple Computer 1987:7)

Users must be provided with a choice of data structures for navigating the information—varied types of access strategies (menu, map, index, SDMS) so that the user may choose his best strategy. MENTAL MODELS, SEARCH STRATEGY; PROTOCOLS.

Use graphics and/or sound wherever they can enhance the discussion of an idea, an object, or an action. If the information talks about an object, show it. If the instructions say to move it in some way, animate the exact action. If the information talks about something near or inside another object, represent the relationship graphically and whenever possible ion an animation.

A picture or map off all links/options are available at any time. NAVIGATION STRATEGY, SCHEMATIC by clicking a button or a voice command.

Provide the user with an audit trail to browse through. AUDIT TRAIL.

Wherever possible, maintain the spatial relationship of the data to its sources. Approximate the thickness of the manual the information came from with a Scroll bar; information halfway into the manual is halfway down the scroll bar. SPATIAL RELATIONSHIPS Where there is a large amount of text, let the user have the choice of having it read to him. If there are text and graphics associated with the same segment and both do not fit on the Screen, let the user have the choice of which to see.

Give context-specific multiple types of feedback without overloading. Feedback can be sound, a change in a graphic, or text boxes.

Keep it simple—show minimal, but no less, information. If it feels like too much, divide it up.

Metaphors from the Real World: Use concrete metaphors and make them plain, so that users have a set of expectations to apply to computer environments. Whenever appropriate, use audio and visual effects that support the metaphor.

See-and Point or voice commands (Instead of Remember-and-Type): Users select actions from alternatives presented on the screen, the general form of user actions is noun-then-verb, or "Hey, you—do this." Users rely on recognition, not recall; they shouldn't have to remember anything the computer already knows. Most programmers have no trouble working with a command-line interface that requires memorization and Boolean logic. The average user is not a programmer.

Consistency: Effective applications are both consistent within themselves and consistent with one another.

WYSIWYG (What You See Is What You Get): There should be no secrets from the user, no abstract commands that only promise future results. These should be no significant difference between what the user sees on the screen and what eventually get printed.

Feedback and Dialogue: Keep the user informed. Provide immediate feedback. User activities should be simple at any moment, though they may be complex taken together.

Forgiveness: Users make mistakes; forgive them. All the user's action should in general be reversible -let users know about any that aren't.

Perceived Stability: Users feel comfortable in a computer environment that remains understandable and familiar rather than changing randomly.

Aesthetic Integrity: Visually confusing or unattractive displays detract from the effectiveness of human-computer interactions. Different "things" look different on the screen. Users should be able to control the superficial appearance of their computer work place—to display their own style and individuality. Messes are acceptable only if the user makes them—applications aren't allowed this freedom.

Data provides the forward motion, else a button or voice command with a logical designation, such as "Next."

Step back button.

Help button.

Index button.

Map/disc Schematic button.

Table of Contents button.

Finished/done/Quit/End Operation button

View Text/Graphics button

Read text/talk button

Control Panel to manipulate environment, specifically brightness, volume, left/right eye display.

BRIEF DESCRIPTION OF THE DRAWINGS

The present invention is further described in detail below with reference to the accompanying drawing, in which.

DETAILED DESCRIPTION OF A PREFERRED EMBODIMENT

The instant invention employs a small, portable computer, and thus should utilize the fastest processor available. Currently, a 486 or pentium (100 MHZ or greater) is preferred, having at least 16 MB or more of RAM. Likewise, the invention employs a mass data storage device that would provide the largest portable storage and the quickest access time. Presently, CD-ROM and DVD-ROM technologies are utilized, but future technologies that provide information quickly are also incorporated within the scope of the instant invention. It is further understood that the CPU will run any appropriate operating system, which currently would include MS-DOS, Windows (3.1, 3.11, 95, NT), OS/2, or any of the Macintosh systems (like System 7 or 8). The requirement is one of physical size and performance, i.e., the entire unit must be wearable, and thus preferably weigh less than two pounds.

A heads-up single ocular display, such as the Private Eye™ from Reflection Technology which is lightweight display device (2 ounces), is utilized, although any such display that is wearable, does not impede normal vision, and presents an image to one or both eyes while allowing the user to view his surrounding, is within the scope of the invention. The heads-up display, in a preferred embodiment, is mounted on a headset with earphones and a microphone. Its "screen" is projected into virtual space about 12 inches in front of the viewer's eyes. The crisp high resolution image is sharper than a standard computer screen, and it is anticipated that computer screen technology will continue to improve and be satisfactory in the future for the purposes intended herein.

A number of controller devices are within the scope of the invention. Under a preferred embodiment, a "commander mouse" has been employed, involved a pressure-sensitive, zero-motion pointing device, or any hands-free controller, which can be carried in a belt-mounted holster. The device can be comfortably operated from the belt by right- and left-handed users or can be removed from the belt and hand-held. Other such devices would include a voice-activation module for receiving voice commands and translating these commands into computer-recognizable command code. Likewise, it is within the scope of the invention to provide a module that will acoustically receive audio information from the user (as in, e.g., the user speaking into or near the headset-mounted microphone or other receiving device) coupled with the ability to store such audio information and to translate such audio information into text or other means for other means of playback or printout.

The audio features of the instant invention include a real-time, text-to-speech voice capability in a choice of English, Spanish, French, German, Italian and Japanese. In this manner, the device can "read" text or other files and translate them into audio signals which the user hears through headphones or other audio playback equipment. This is especially helpful for users who have difficulty reading. Likewise, this module can also play back prerecorded audio. These features enable the worker to keep his eyes on the job at hand while listening to instructions.

The system may also employ technology which allows only coded access by an authorized worker who knows the particular code. Likewise, this technology can involve a "time-out" or "screen-saver" sequence for shut down, for protection.

With two credit card-sized PCMCIA slots or any other portable I/O ports, users can add numerous other functions to the instant invention, including, for example, a 488/IEEE port for diagnostic connections to internal computers in heavy equipment; a smart card for updates to manual materials. The smart card can also be programmed to deliver urgent audio/visual warnings when the invention is turned on. This feature is especially important to safety sensitive industries such as a nuclear power plant.

A PCMCIA card also eliminates the need for paperwork, but keeps detailed records of worker accountability and regulation compliance. Under the current invention, the PCMCIA card is programmed by the scheduler or supervisor with the procedure and check list for the day's maintenance tasks. The worker checks off each task, including inventory used. Each task is automatically time-date stamped. The worker can add via voice input any unusual problems encountered. The worker turns in his PCMCIA card at the end of the day, and the information is transferred to a CMMS program where it is stored for delivery to government regulators or agencies, and also ported to other files for report analysis and a record of accountability.

PCMCIA cards are also available in forms which provide connectivity with local area networks: downloading/upload of information and instructions with wired or wireless modems (IR frequencies). Motorola PCMCIA news card provides the ability to distribute information from a host system to the instant invention by using paging technology bandwidth. The instant invention's communication ability from the field provides the user with interactivity within the system and with a home office host computer database. This improves performance with less time needed for the organization of maintenance work and provides the user with continually updated information and job orders, therefore, allowing more time for maintenance function.

An externally mounted battery pack powers the instant invention for at least five hours of continuous use. The instant invention is also mounted on the belt.

Figure 1:
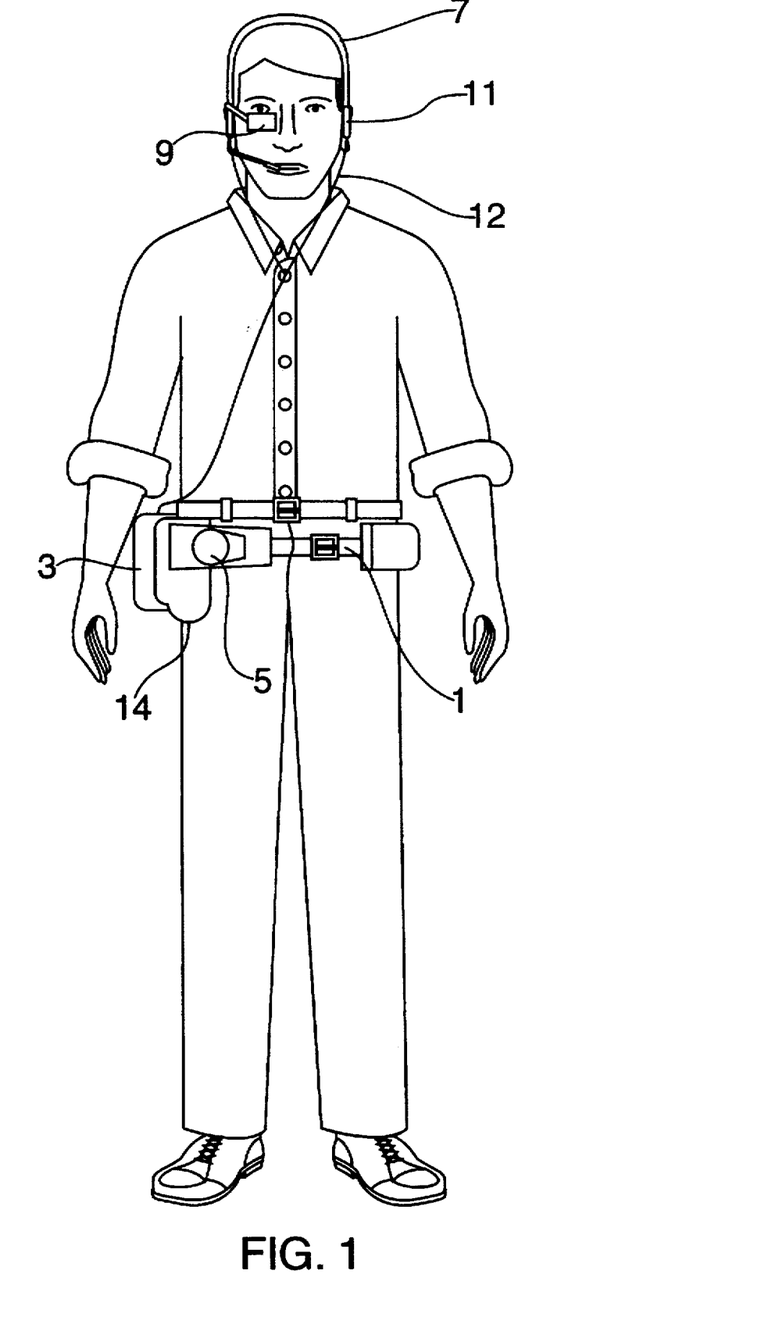
FIG. 1 is a drawing of a user wearing the system of the present invention.

The information retrieval system of the present invention is shown in a preferred embodiment in FIG. 1. The user wears a belt 1 holding a carrying case 3, a command control device 5 worn on one hand and a headset 7 which may be worn under the user's headgear (not shown). The headset 7 supports a head mounted image display device 9 and one or more earphones 11. The apparatus is designed to impede the physical movement of the user as little as possible and therefore is constructed of light weight materials and thin wire connectors. Electrical connections 12 and 14 extend from the headset 7 and command control device 5 to the carrying case 3.

Figure 2:
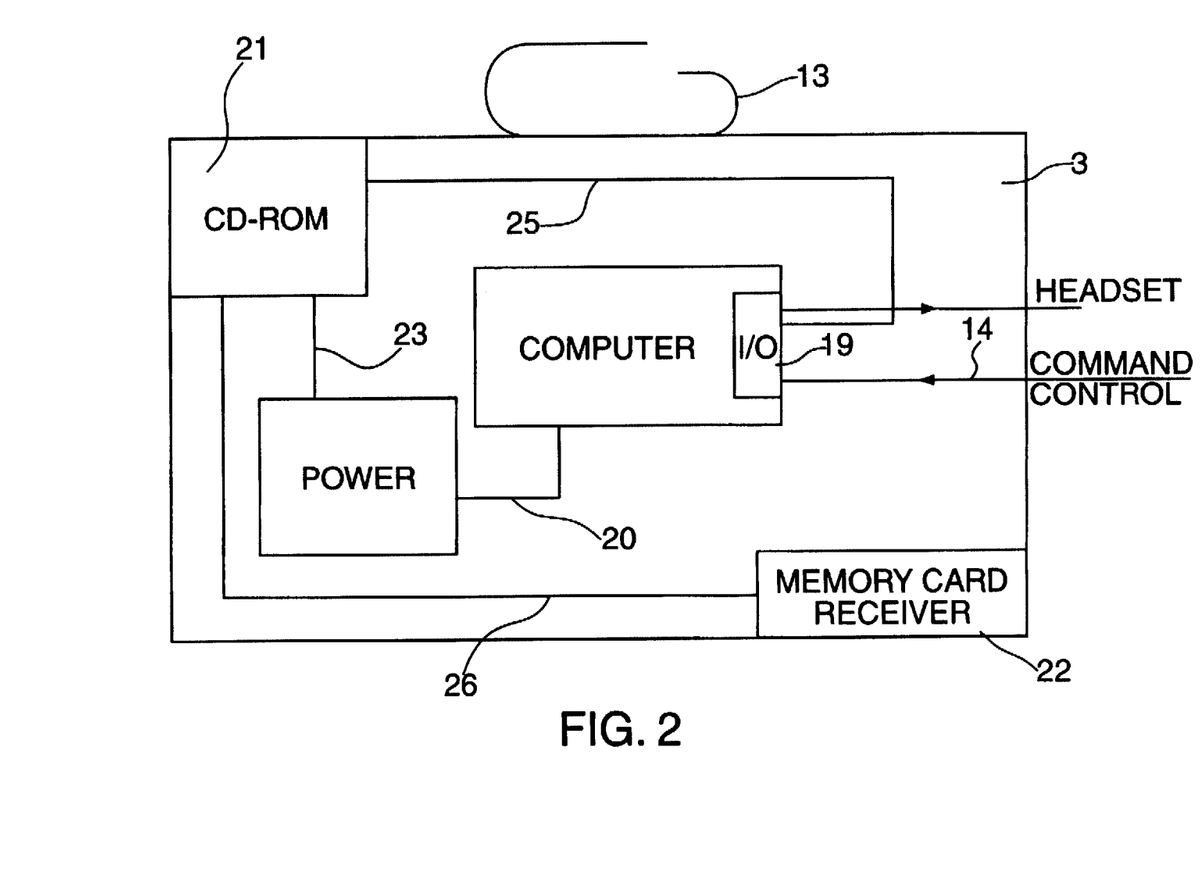
FIG. 2 is a schematic drawing of the components of the carrying case in the preferred embodiment of the invention.

As shown in FIG. 2, the carrying case 3 contains a clip or Velcro belt attachment 13 and encloses a power supply 15, preferably a battery, supplying D.C. power to a computer 17 having a CPU, RAM and ROM memory and I/O ports 19. The I/O ports interface with the connector 14 for receiving input from the command control device 5 and interface with the connector 12 for providing output to the image display device 9 and earphone 11. It is understood that the image display device 9 can be any of a number of different displays, including flat screen displays.

The computer receives power via connector 20 from power supply 15. Also contained within the carrying case 3 is a CD-ROM delivery drive 21, and a memory card receiver 22 both receiving power via connectors 23 and 24. The CD-ROM delivery device and memory card receiver are connected by data buses 25 and 26 to the input ports 19.

The CD-ROM delivery drive accepts digitized data on 5¼ inch compact discs, rotating at 300 r.p.m. An alternative to the CD-ROM could be any memory medium, for example, EPROMs that could be read by computerized means, such as a ROM reader or a second memory card, or DVD-ROM's. The critical characteristics are that the memory medium be replaceable (to allow the user to input different data) and that it be lightweight and compact.

Figures 3, 3A:
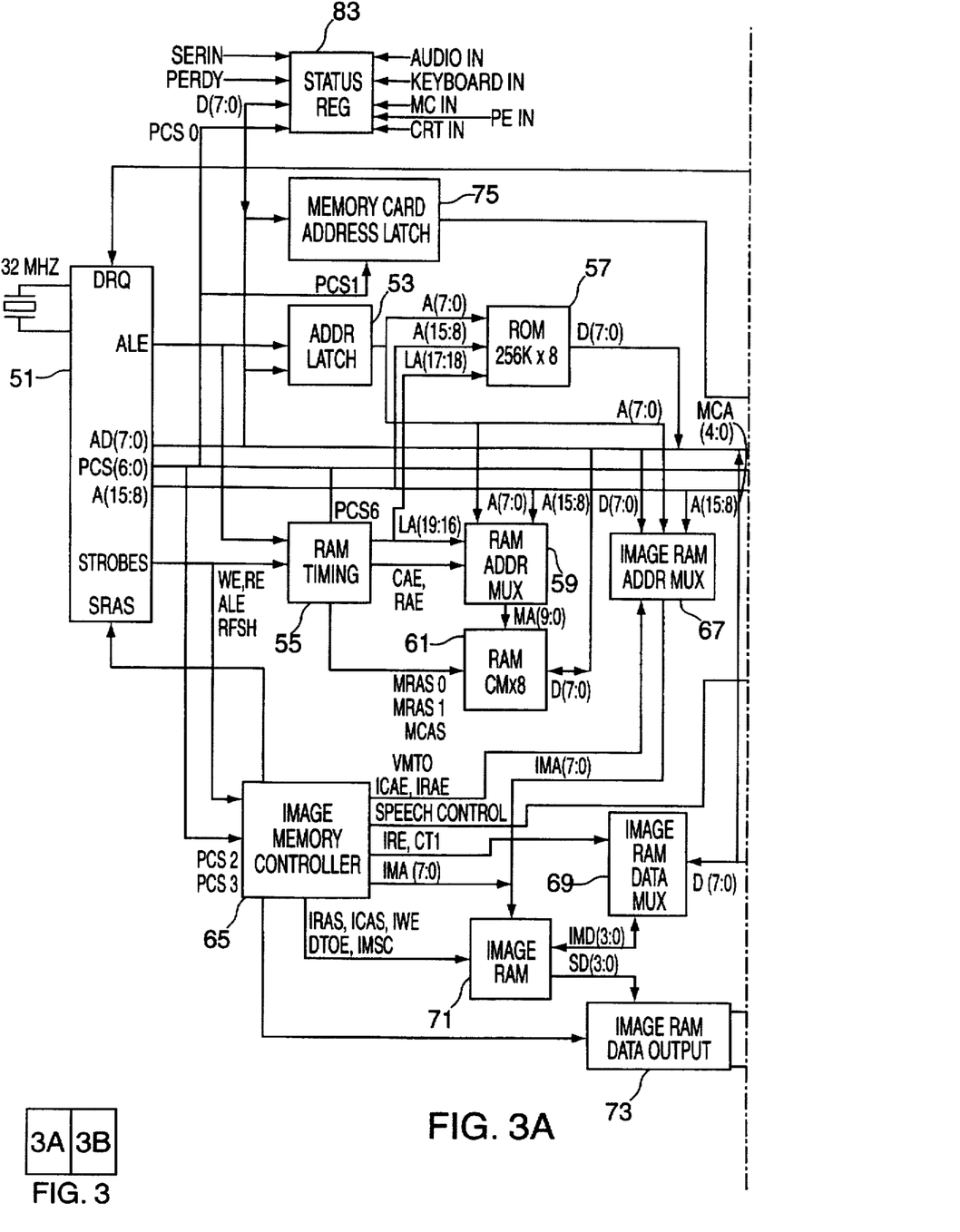
FIG. 3 is a schematic drawing of the components of the computer of the present invention.
Figure 3B:
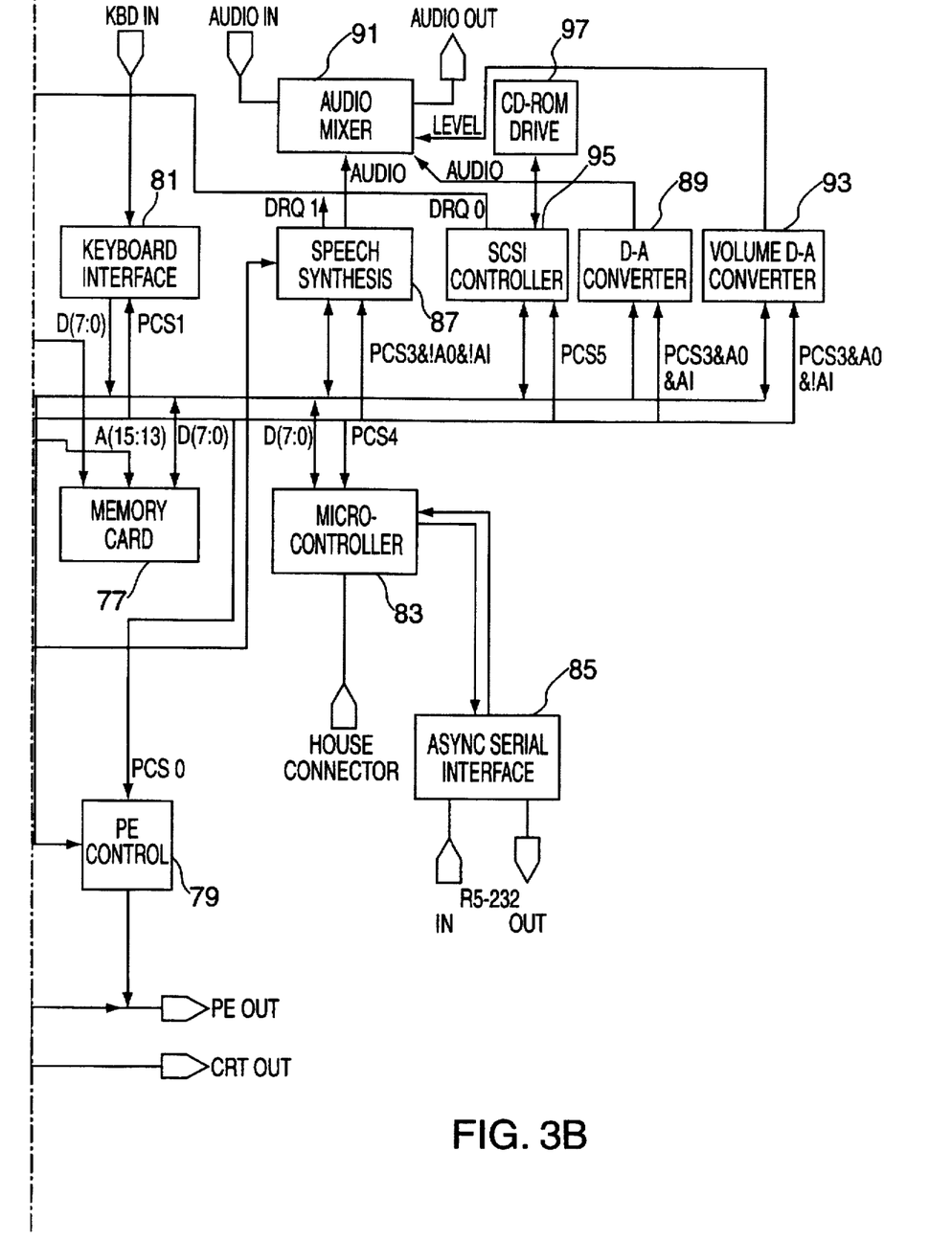

The arrangement of the components under a preferred embodiment of the subject invention is shown schematically in FIG. 3. Referring to that figure, microprocessor 51 is shown as an Intel 80C186 or 80C188 type microprocessor, which has a 16-bit internal data bus and a self-contained interrupt controller, DMA controller, 3-channel counter/timer, and an internal peripheral chip select decoder. It should be understood that a faster processor if utilized would be well within the constraints of the subject invention. The microprocessor 51 generates a 16-bit address bus multiplexed with 8 or 16 bit bidirectional data lines. FIG. 3 shows an 8-bit data version (80C188), with AD(7) through AD(O) being multiplexed data and address bits 7 through 0 respectively. The trailing edge of address latch signal ALE indicates stability of the address signals. The microprocessor 51 also generates write-enable strobe signal WE, read-enable strobe signal RE, and refresh enable signal RFSH, along with decoded Peripheral Chip Select signals PCS(O) through PCS(6). The operation of the microprocessor 51 is synchronized by the SRDY signal, which extends the operation of the bus data exchange cycle during the time that SRDY is held low. This enables the external circuitry to delay the completion of a data transfer operation to or from the microprocessor until the external circuitry has completed its operation.

The address latch 53 comprises an eight bit (sixteen bits wide for 80C186 version) transparent latch gated by the ALE address latch signal. It holds signals present at its inputs at the trailing edge of ALE. The address latch 53 outputs comprise address signals A(7) through A(O).

The program RAM timer 55 generates row address strobe signal MRAS, column address strobe signal MCAS, row address enable signal MRAE, and column address enable signal MCAE in correct timing relationship to permit operation of dynamic random access memory (DRAM) 61. The program RAM timer 55 latches address signals A(19) through A(16) with the trailing edge of ALE signal to produce latched address signals LA(19) through LA(16) in a manner analogous to address latch 2. For one preselected set of values of latched signals A(19) through A(16) the outputs LA(19) through LA(16) are replaced by the contents of a four-bit-wide latch. The contents of this latch are determined by the low order four data bits AD(3) through AD(O) present during the peripheral select signal PCS(6). This maps different portions of the DRAM as selected by the value latched into the internal latch to respond within the preselected address range and to fail to respond within ranges of addresses which would otherwise conflict with Read-Only Memory (4).

Read-Only Memory (ROM) 57 is a static read-only memory which responds to addresses A(19) through A(O) by presenting stored data to the data lines AD(7) through AD(O). It is used for the storage of fixed programs and data.

The program RAM address multiplexer 59 presents ten bits of address signals LA(19) through LA(16) and A(15) through A(O) under control of row-address enable signal RAE to program DRAM memory address lines MA(9) through MA(O). It presents the remaining ten bits of address signals under control of column address enable signal CAE to aforementioned program DRAM memory address lines MA(9) through MA(O).

Program RAM 61 is a Dynamic Random Access Memory (DRAM) having address signals driven by lines MA(9) through MA(O), data signals driven by data lines AD(7) through AD(O), row-address strobe driven by signal MRAS, column address strobe driven by MCAS, and write-enable signal driven by write strobe WE. It operates at an access time of 120 nanoseconds.

Status Register 63 is an eight bit data buffer which drives the data from its inputs onto the data signals AD(7) through AD(O) under command of peripheral chip select signal PCS(O). The inputs are connected to signals which respond to the insertion of various connectors into their designated sockets, indicating that various peripheral devices are connected. Through this means the program may respond to different configurations of externally connected devices.

Image memory manipulation is provided by Image Memory Controller 65, Image Memory Address Multiplexer 67, Image Memory Data Multiplexer 69, Image Memory 71, and Image Memory Data Output 73. Memory Card Address Latch 75 is a five-bit latch which latches data from the low-order five bits of the data bus AD(4) through AD(O) under control of write enable WE during peripheral chip select PCS(1). It generates five high-order bits of the address to memory card 77 and allows for the selection by the program of the 64 kilobyte block of memory within the memory card which will appear to the microprocessor when it is addressed.

The memory card 77 is a removable card containing from 64 Kbytes to 1 Mbyte of nonvolatile memory, generally static RAM with integral battery backup power. Greater memory, if available, would be well within the constraints of the present invention. Preferably it meets the PCMCIA memory card specification and has eight or sixteen data bits, 20 address bits, read-enable RE signal, and memory chip select MCS2 from the microprocessor 51.

The video output is controlled by Virtual Display Control 79. The keyboard interface 81 receives signals from the zero motion mouse, generates an interrupt signal when a character is received, resets the interrupt and places the received data on a data bus AD(7) through AD(O) upon read command during peripheral chip select PCS1.

The Micro-Controller 83 is a single-chip integrated microprocessor having 4K internal ROM, 256 bytes of RAM, four analog inputs and internal asynchronous serial receiver-transmitter. It connects to data signals AD(7) through AD(O) and responds to read-enable signal RE or write-enable signal WE during peripheral chip select signal PCS(4). One output bit is connected to the microprocessor interrupt-request line IRQ3. The program resident in the microcontroller is written to handle analog data generated by the joystick input and to convert such x/y analog signals into sequences of data which mimic the data transmitted by a serial mouse. In addition, the microcontroller program manages data transfers to and from the internal serial receiver-transmitter under command of the microprocessor's program.

The asynchronous serial interface 85 comprises level translators which interface between the internal circuitry of the microcontroller and external the asynchronous serial data lines such as those conforming to RS-232 or RS449, to provide an alternative for down loading information from the system.

The speech synthesizer 87 comprises an integrated microcontroller such as a Texas Instrument 50C10 having internal ROM and RAM and capable of generating a pulse width-modulated analog output. This chip simulates the human vocal tract and operates under control of software run by the microprocessor when speech is required. The synthesizer chip is loaded with data under control either of the main program or of an interrupt generated by the timer within the microprocessor. The clock input is a 10.66 MHz signal generated by dividing the 16 MHz system clock by a modulus of 1.5. Data are written to and read from the synthesizer chip 87 under control of the conjunction of the peripheral chip select signal PCS3 and the negation of address signals A(O) and A(1). The direction of data transfer is controlled by data direction signal DTR generated by the microprocessor.

Audio Digital-to-Analog Converter 89 is an eight bit digital-to-analog converter containing internal data latch which accepts data from an external latch. The external latch is loaded with data from data signals AD(7) through AD(O) under command of the write enable signal WE during the conjunction of peripheral chip select signal PCS3 and address bits A(O) and A(1). The digital-to-analog converter 89 includes circuitry to divide the 16 MHz system clock by 2,048 to produce a signal at 8,192 Hz which causes the transfer of data from the external latch to the internal latch and simultaneously sets a DMA request signal DRQ1. This signal initiates a direct memory access transfer in accordance with parameters which are stored into registers within the DMA controller section of the microprocessor. The analog output of the audio digital-to-analog converter is fed to the audio mixer and amplifier 91.

The Volume Digital-to-Analog Converter 93 comprises five bit CMOS latch, the outputs of which drive a network of resistors so as to produce a voltage which can take 32 possible levels in response to the different values which can be entered into the latch. Data are entered from data signals AD(7) through AD(2) under command of write enable signal WE during the conjunction of peripheral chip select signal PCS3 and address signals A(O) and the inverse of A(1). The analog output of this circuit is fed to the audio mixer and amplifier circuit where it is used to control the level of the amplification.

The Audio Mixer and Amplifier 91 comprises an analog circuitry comprised of LM324 operational amplifiers, a four-pole Butterworth filter and a MC3340 volume-control amplifier. The output of the audio digital-to-analog converter is mixed through the summing junction of a stage of an LM324 operational amplifier with audio from the analog output of the speech synthesizer, and the resulting output is fed through a four-pole Butterworth filter which is realized by a switched-capacitor filter of the TIL04 type. The clock input of the filter is driven by a 516 Khz signal generated by dividing the 10.66 MHz clock of the speech synthesizer by a modulus of 20.

Disc Controller 95 is a single-chip integrated controller which accepts commands from the microprocessor through data lines AD(7) through AD(O) under command of write enable signal WE during peripheral chip select signal PCS5 and which performs control sequence operations which command the operation of the CD-ROM disc drive 97. Commands include seek-to-sector, read sector, and recalibrate. Status data and data read from the selected sectors are transferred through the controller and are read by read enable signal RE during peripheral chip select signal PCS5.

The CD-ROM Disc Drive 97 is a portable disc drive similar to audio compact disc drive having modifications of electronics so as to perform higher levels of error correction required for data transfer and including interface circuitry capable of responding to control sequence commands generated by the disc controller chip. Optical storage techniques allow the storage of over 600 Mbytes of data on a 5 inch diameter disk.

The preferred viewer is Model P4 available from Reflection Technology of Waltham, Mass. It comprises a 720×280 pixel resolution that corresponds to 80 text characters by 25 lines with 9×11 font. The image is equivalent to viewing a 9.3"×6" (12" diagonal) screen at 24". The location of the user's eye in order to view the full image is 20 mm from the viewing window. The headset and display occupy a space less than 1.5" high for storing and weighs 3¾ ounce with cable.

The preferred text to speech converter is available from Berkeley Speech Technologies of Berkeley, Calif. and converts ASCII text to speech. The preferred zero motion mouse includes a small ball which is slightly rotated or pressed by motion of the user's thumb. The mechanism of controlling the motion of a cursor by the application of such a device is described in the present inventor's U.S. Pat. No. 5,012,231, entitled "Method and Apparatus for Cursor Motion Having Variable Response".

Although the system has been described in terms of a preferred embodiment it should be understood that the full scope of the invention is determined only by the proper interpretation of the following claims.

We claim:

1. A wearable hypermedium information retrieval system for displaying predetermined digitized data, comprising:

(a) a computer having I/O port means;

(b) a large capacity information storage and retrieval device interfaced with said I/O port means adapted to receive a memory medium containing the predetermined digitized data, said storage and retrieval device being adapted to access the data on said memory medium and to provide said data to said I/O port means, said predetermined digitized data being further organized in a hypermedium format for hypermedium access and retrieval;

(c) a virtually hands-free command control device presenting no interference to ordinary use of the hands of the user to provide input commands from the user to said computer via said I/O port means;

(d) a headset adapted to be worn by said user and a head mounted image display supported by said headset comprising virtual image display means comprising an eye-piece adapted to be positioned in front of one eye of the user and to display video display information from said computer; and (e) further comprising at least one PCMCIA card slot.

2. A wearable hypermedium information retrieval system for displaying predetermined digitized data, comprising:

(a) a computer having I/O port means;

(b) a large capacity information storage and retrieval device interfaced with said I/O port means adapted to receive a memory medium containing the predetermined digitized data, said storage and retrieval device being adapted to access the data on said memory medium and to provide said data to said I/O port means, said predetermined digitized data being further organized in a hypermedium format for hypermedium access and retrieval;

(c) a virtually hands-free command control device presenting no interference to ordinary use of the hands of the user to provide input commands from the user to said computer via said I/O port means;

(d) a headset adapted to be worn by said user and a head mounted image display supported by said headset comprising virtual image display means comprising an eye-piece adapted to be positioned in front of one eye of the user and to display video display information from said computer; and (e) wherein said virtual hands-free command controller includes retinal input control.

3. A wearable hypermedium information retrieval system for displaying predetermined digitized data, comprising:

(a) a computer having I/O port means;

(b) a large capacity information storage and retrieval device interfaced with said I/O port means adapted to receive a memory medium containing the predetermined digitized data, said storage and retrieval device being adapted to access the data on said memory medium and to provide said data to said I/O port means, said predetermined digitized data being further organized in a hypermedium format for hypermedium access and retrieval;

(c) a virtually hands-free command control device presenting no interference to ordinary use of the hands of the user to provide input commands from the user to said computer via said I/O port means;

(d) a headset adapted to be worn by said user and a head mounted image display supported by said headset comprising virtual image display means comprising an eye-piece adapted to be positioned in front of one eye of the user and to display video display information from said computer; and (e) wherein said hypermedium format is selected from the group consisting of hypertext, hyperpix and combinations thereof.

\* \* \* \* \*